United States Patent

[11] 3,626,963

| [72] | Inventor | Hermann Ziermann<br>Cheshire, Conn. |
|---|---|---|
| [21] | Appl. No. | 8,569 |
| [22] | Filed | Feb. 4, 1970 |
| [45] | Patented | Dec. 14, 1971 |
| [73] | Assignee | United Aircraft Corporation<br>East Hartford, Conn. |

[54] FLUID MIXER UTILIZING FLUIDIC TIMER ACTUATING FLUIDIC AMPLIFIER VALVES
13 Claims, 3 Drawing Figs.

| [52] | U.S. Cl. | 137/81.5 |
|---|---|---|
| [51] | Int. Cl. | F15c 1/12 |
| [50] | Field of Search | 137/81.5 |

[56] References Cited
UNITED STATES PATENTS

| 3,080,886 | 3/1963 | Severson | 137/81.5 |
|---|---|---|---|
| 3,327,726 | 6/1967 | Hatch, Jr. | 137/81.5 |
| 3,348,562 | 10/1967 | Ogren | 137/81.5 |
| 3,402,727 | 9/1968 | Boothe | 137/81.5 |
| 3,429,324 | 2/1969 | Brown et al. | 137/81.5 |

*Primary Examiner*—William R. Cline
*Attorney*—Norman Friedland

ABSTRACT: Mixing of two or more gases is accomplished by controlling the switching frequency of fluid amplifier valves metering the different gases by fluid timing devices. A fluidic timer switches the power stream to the output channels of a fluidic amplifier operatively connected to the fluid amplifier valves.

FLUID MIXER UTILIZING FLUIDIC TIMER ACTUATING FLUIDIC AMPLIFIER VALVES

BACKGROUND OF THE INVENTION

Typically the method of obtaining a mixture of two or more gases is by the utilization of flow meters which measure each gas and are regulated to give the ratio desired. The flow meter when used in its customary fashion serves to measure the quantity of flow and the valve is either manually or automatically regulated to give the desired amount necessary to fulfill the percentage desired of the mixture. Of the types that are known, the valve, actuator and sensing mechanisms employ movable parts and are characterized as being complicated particularly where exact amounts are required as, for example, in clinical uses where respiration therapy, anesthetize therapy and the like are required.

I have found that I can obviate the problems of complexity and high costs and provide an accurate and reliable gas mixing device which minimizes the number of movable parts, eliminates any electrical parts or spark-creating components which are important in certain hospital applications. This invention employs a fluidic logic circuitry which is capable of high-speed operation and can switch from one gas to another in frequencies of 10 milliseconds which provide good homogenous gas mixtures. Additionally, the mechanism of the invention lends itself to being added on to in a building block fashion so as to accommodate the mixing of more than two gases while also affording the advantage of adjusting each gas independently to obtain the desired percentage.

SUMMARY OF INVENTION

A primary object of the invention is to provide a high-speed gas mixer which employs a minimum number of movable parts.

In accordance with this invention, fluidic logic driving timing mechanism for effectuating a predetermined pulse frequency serves to mix two or more gases which mechanism is characterized as being simple to construct, relatively economical to manufacture, and highly reliable and accurate.

Other features and advantages will be apparent from the specification and claims and from the accompanying drawings which illustrate an embodiment of the invention.

DESCRIPTION OF THE PREFERRED EMBODIMENT

As applied herein it is to be understood that the term fluidic logic refers to fluidic devices that are utilized to respond to various signals and give commands to an output device. Fluidic devices are well known in the art and their operations and functions have via written about in great detail. It is, therefore, unnecessary for the purpose of this application to explain in detail its operation. Suffice it to say that the fluidic device consists of a power stream which is directed to flow through either one or two output channels. Control ports located near the splitter section of the fluidic device serves to switch the power stream from one channel to the other. Obviously, no moving parts are necessary to cause the stream to switch from one to the other channel.

Figure 1:
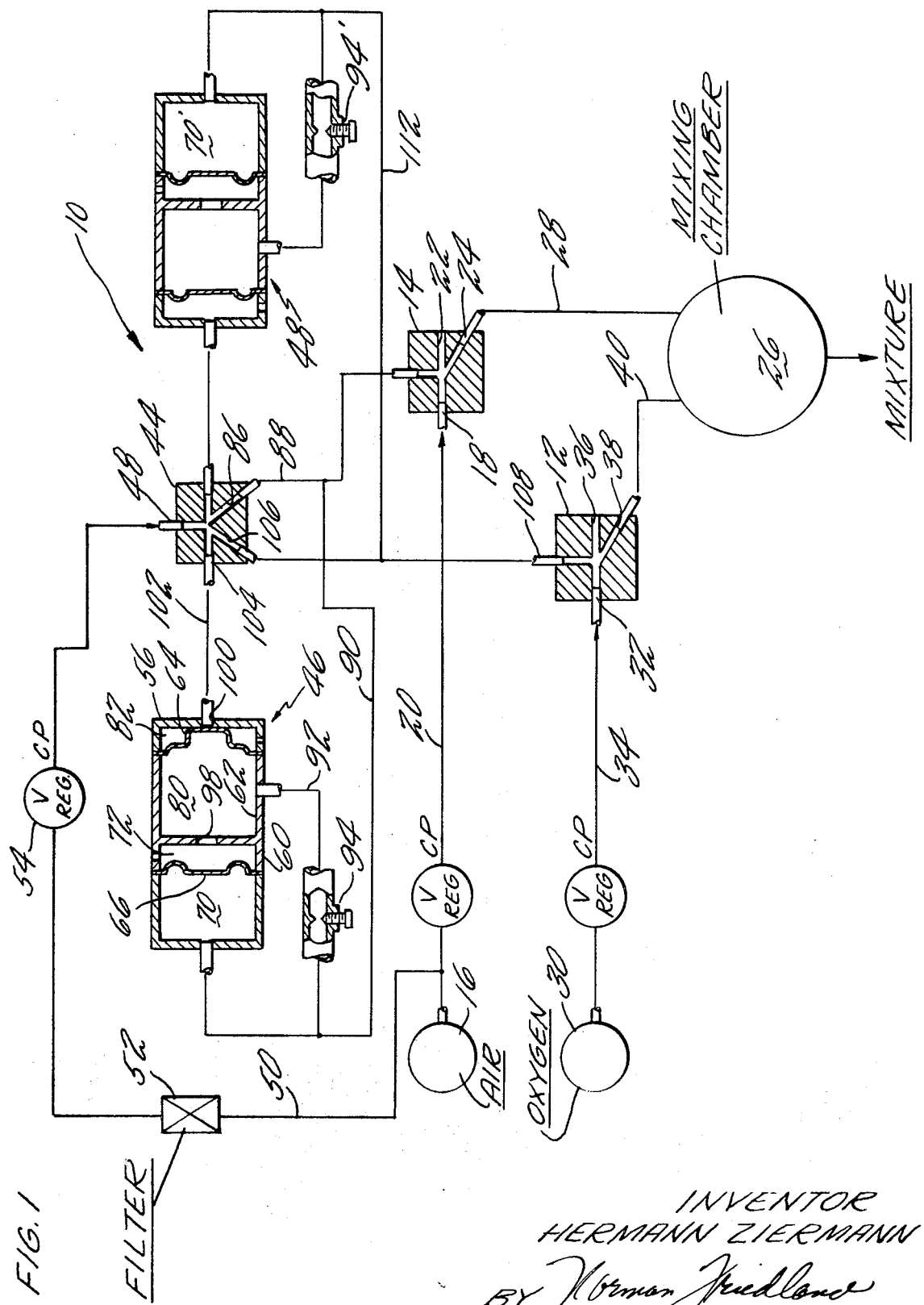
FIG. 1 is a schematic illustration, partly in section, of the invention.

Now referring to FIG. 1, which shows the gas mixing apparatus as comprising the fluidic logic circuitry, generally illustrated by numeral 10, controlling a pair of fluidic valves 12 and 14. Compressed air taken from a supply source 16 is admitted to the power nozzle 18 via line 20 of the fluid amplifier valve 14.

Normally the power stream in fluid amplifier 14 is directed to channel 22 until the switching mechanism, to be described hereinbelow, switches the power stream to output channel 24 where it is directed to the mixing chamber 26 via line 28. Similarly, oxygen from the oxygen supply 30 is admitted to the power nozzle 32 via line 34 and is normally directed to the output channel 36 until a signal for switching it into output channel 38 causes it to enter the mixing chamber 26 via line 40. It being noted that flow through channels 22 and 36 are in the order of 0.05 c.f.m. (cubic feet per minute) which is substantially negligible. The purpose of the fluidic logic mechanism 10 is to time the particular pulsation between the oxygen and the air in order to achieve the desired mixture of oxygen and air. This is accomplished by controlling the flip-flop type of fluid amplifier 44 to switch by the cooperating timing mechanisms 46 and 48. As can be seen in FIG. 1, compressed air is admitted to the power nozzle 48 of the flip-flop fluid amplifier 44 via the branch line 50. It may be desirable to include an air filter 52 disposed in line 50 for filtering out any of the foreign matter contained in the air and a pressure regulator 54 also disposed in line 50 may be utilized to keep the pressure admitted to the power jet 48 at a constant value. The particular pressure levels are design considerations and not considered to be a part of the invention. Fluid amplifier 44 is switched in accordance with the timing mechanisms 46 and 48. Both timing mechanisms are similarly constructed and for the sake of convenience and simplicity like numerals will be used for like parts. Referring to timing mechanism 46 comprised of container 56 having a dividing wall 58 separates it into two separate compartments 60 and 62. Each compartment includes a diaphragm 64 and 66 separating the compartments into separate subcompartments 70 and 72 and 80 and 82. As can be seen from FIG. 1, flow from the output channel 86 of fluid amplifier 44 is admitted into chamber 70 via line 88 and branch line 90 and subcompartment 80 communicates with branch line 90 via branch line 92. The flow admitted to subcompartment 80 is restricted by the variable restrictor 94. Thus concomitantly while chamber 70 is being filled, chamber 62 is being filled at a slower rate. Obviously, once chamber 70 is filled, diaphragm 66 will be urged against the opening 98 formed in wall 58. Once this chamber is completely filled, subchamber 80 will then completely fill urging diaphragm 64 against the orifice 100. This signals the fluid amplifier by line 102 and control port 104 to switch to output channel 106. Output channel 106 communicating with control port 108 via line 110 causes the fluid communicating with control port 108 via line 110 causes the fluid amplifier 12 to switch to output channel 38 and causing oxygen to flow into mixture chamber 26. Simultaneously, timer mechanism 48 is actuated by bleeding air from line 110 into subchamber 70' via line 112 which causes timing mechanism 48 to signal fluid amplifier 44 when a predetermined time has been reached. The time is selected by adjusting either orifice 94 or 94'. The rate at which the timers can cause the fluidic flip-flop amplifier 44 to switch will determine the ratio of gases fed into the mixing chamber 26. In laboratory tests the high-speed gas mixer has been utilized at mixing speeds up to 10 millisecond intervals which speed has been found to provide a good homogenous mixture.

Figure 2:
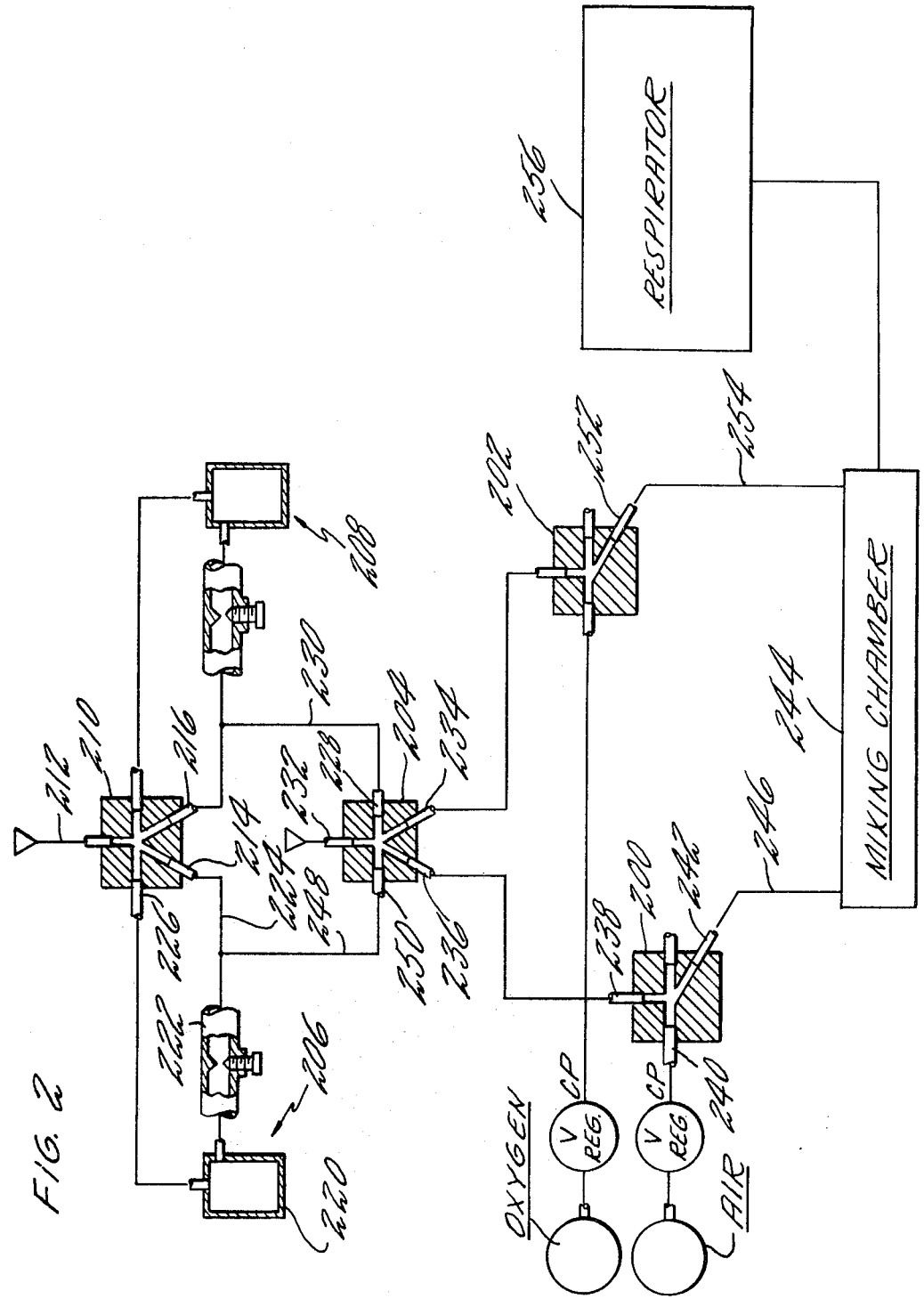
FIG. 2 is a schematic illustration showing another embodiment of this invention.

FIG. 2 is another representation of a gas mixing system but is a simplified version by utilizing an accumulator or the mechanical equivalent of an electrical capacitor. In this instance the accumulator is a container having a fixed volume that receives a predescribed amount of fluid before it is discharged therefrom. In this embodiment air is controlled by normally closed fluid amplifier valve 200 and oxygen is controlled by normally closed amplifier valve 202. The switching of these amplifiers is controlled by the flip-flop amplifier generally indicated at 204. The timing mechanism in this embodiment includes a timing device generally indicated by 206 and timing mechanism generally indicated by 208 each of which control the switching of fluid amplifier 210. The operation of this high-speed gas mixer is such that high-pressure air is admitted to the power nozzle 212 where it either flows into output channel 214 or 216 where it is then admitted into the container 220 by way of a variable restriction 222 disposed in line 224. When container 220 is filled and the rate of its filling is controlled by adjusting the variable restrictor 222, it will admit a signal to control port 226 for causing the fluid amplifier 210 to switch from output channel 214 to output channel 216. This immediately deactivates timer 206 and activates timer 208 which respond in identical fashion. When timer 208 is actuated, the signal is admitted to control port 228 via branch line 230 for causing the fluid from power stream 232 to switch from channel 234 into channel 236 where it is admitted to control port 238 of fluid amplifier 200 causing it to open or divert the flow from the power stream 240 into channel 242 where it is admitted to the mixing chamber 244 via line 246. Similarly, when timer 206 is actuated, the fluid amplifier 204 is caused to switch such that chamber 234 is now in communication with the power stream 232. It being noted that fluid amplifier 204 is switched when flow in line 224 is evidenced via line 248 which is in communication with control port 250. Switching of fluid amplifier 202 causes oxygen to switch into output channel 252 and is admitted into mixing chamber 244 via line 254. The mixed gases can then be utilized in any manner that is desired as, for example, it may be used to fulfill the requirements of the respirator 256 shown in blank which respirator may be of the type disclosed and claimed in patent application, Ser. No. 834,004 filed by Joseph C. Peters and Hermann Ziermann on June 17, 1969, and assigned to the same assignee.

Figure 3:
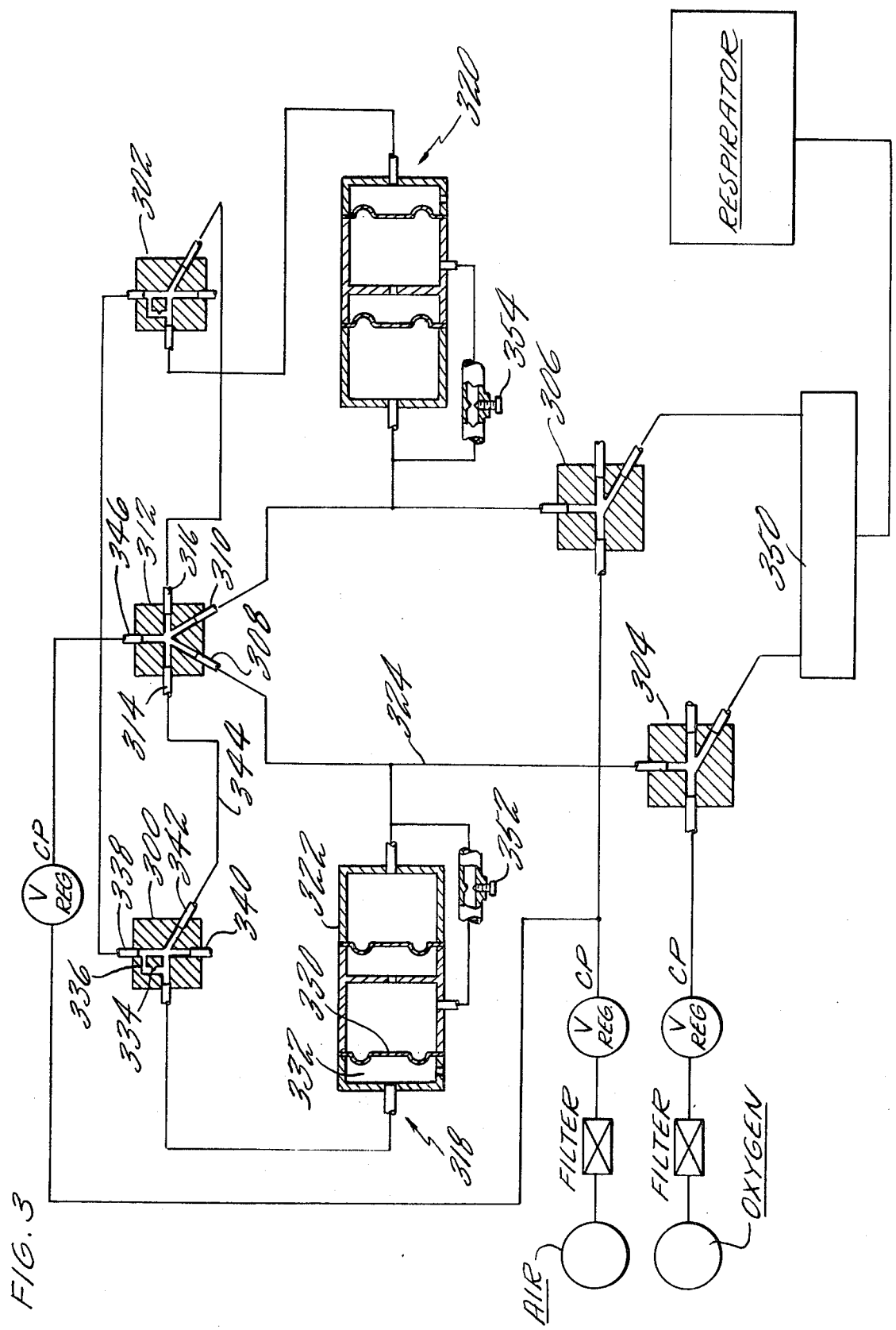
FIG. 3 is a schematic illustration showing still another embodiment of this invention.

In the embodiment shown in FIG. 3, the mixing system is substantially identical to the one shown in FIG. 1 except the flip-flop fluid amplifier responds to back pressure switches which are in the nature of fluid amplifiers and are shown as back pressure switches 300 and 302. Thus, fluidic amplifier valves 304 and 306 are turned on and off by actuating channels 308 and 310 of flip-flop fluid amplifier 312 respectively. These channels are actuated by turning on the control ports 314 and 316 by the timing mechanism generally illustrated by numerals 318 and 320. Thus, back pressure switch 300 responds to the timer 322 sensing the flow through output channel 308 which is being conducted through line 324. This pressure is sensed similarly to the pressure sensed by the container 56 shown in FIG. 1. When diaphragm 330 closes off the orifice 332, flow passing through restrictor 334 in passage 336 serves to switch the fluid from the power nozzle 338 from channel 340 into channel 342 which is, in turn, connected to control port 314 via line 344 for switching the power stream 346 from channel 308 to channel 310 for actuating fluid amplifier valve 306. This serves to switch the air to the channel communicating with the mixing chamber 350. Similarly, oxygen fluid amplifier valve 304 will respond to the switching timing mechanism 320 and the back pressure switch 302. The rate at which the timing mechanisms perform the switching is controlled by varying the size of the orifice of variable restrictor 352 or 354. Both restrictors may be ganged so that they synchronously vary the areas.

Thus, according to this invention, switching of two or more gases may be effectuated by utilizing fluid amplifiers for switching the gases at a predetermined time interval. The timer being adjustable to determine the time intervals of each of the gases in order to obtain a predetermined gas mixture. Obviously, a minimum number of moving parts are required since the fluid amplifiers are switchable without the need of moving parts. Except for the means for adjusting the restrictions, the only moving parts required obviously are the diaphragms in the switching containers of FIGS. 1 and 2. Thus, what has been shown by this invention is a simple device for mixing two or more gases by controlling the frequency of switching from one gas to the other by preset timing mechanisms. Such a device is characterized as being simple to construct and relatively inexpensive to fabricate.

It should be understood that the invention is not limited to the particular embodiments shown and described herein, but that various changes and modifications may be made without departing from the spirit or scope of this novel concept as defined by the following claims.

I claim:

1. Apparatus for mixing two or more gases comprising a mixing chamber, a first source of the first gas and a second source of the second gas, a first connection means interconnecting said first source and said mixing chamber, a second connection means interconnecting said second source and said mixing chamber, a first fluid amplifier valve disposed in said first connection means for blocking said gas from said mixing chamber, a second fluid amplifier valve disposed in said second connection means for blocking said second gas from said mixing chamber, in combination with fluidic timing means connected to sequentially actuate said first and second fluid amplifier valves at a predetermined frequency to alternately interconnect said first source with said mixing chamber and said second source with said mixing chamber.

2. Apparatus as claimed in claim 1 wherein said fluidic timing means includes a fluid amplifier and adjustable timing means operatively connected to said fluid amplifier for switching thereof in a predetermined time relationship so as to adjust said frequency.

3. Apparatus as claimed in claim 1 wherein said fluid amplifier is a flip-flop type.

4. Apparatus as claimed in claim 2 wherein said adjustable timing means includes a fixed volume chamber for receiving one of said gases and means for regulating flow of said one of said gases at a predetermined rate.

5. Apparatus as claimed in claim 4 wherein said timing means includes a variable volume chamber and an adjustable valve for adjusting the flow into said variable volume chamber.

6. Apparatus as claimed in claim 5 wherein said timing mechanism includes a second variable volume chamber and a fluid connection for leading said one of said gases into said variable volume chamber and a restricted fluid connection for leading said one of said gases into said second variable volume chamber.

7. Apparatus for mixing two or more gases comprising a mixing chamber, separate sources for each of said gases, connection means interconnecting each of said sources and said mixing chamber, first and second fluidic valves disposed in said connection means for connecting and disconnecting each of said sources with said mixing chamber, a fluid amplifier sequentially actuating said first and second fluidic valves for sequentially connecting said sources with said mixing chamber in a predetermined time relation, timing mechanism for controlling said fluid amplifier and means for adjusting said timing mechanism for controlling frequency for switching said fluid amplifier.

8. Apparatus as claimed in claim 7 wherein said fluid amplifier includes a pair of control ports for switching the flow of fluid from a jet nozzle to either of two output channels, said timing mechanism having variable volume chambers and said chambers being operatively connected to said control ports so as to switch said fluid from one channel to the other channel in a predetermined time relationship.

9. Apparatus as claimed in claim 8 where in said variable volume chambers communicate with fluid passing through said output channels of said fluid amplifier.

10. Apparatus as claimed in claim 9 wherein said variable volume chambers include a housing, a pair of flexible elements disposed in spaced relation in said housing and extending thereacross to define therewith a sealed compartment, unrestricted flow from said output channel communicating with one of said flexible elements and restricted flow communicating with said other flexible element.

11. Apparatus as claimed in claim 7 wherein said fluid amplifier includes control ports for switching the flow of fluid from a power nozzle from one to the other two output channels, said timing mechanism including means connected to the control ports for controlling the switching of the fluid amplifier, and said means including an enclosed chamber having an inlet and an outlet, said inlet communicating with one of said output channels, said outlet communicating with said control port and adjustable restriction means disposed between said inlet and said output channel for regulating the flow of fluid into said enclosed chamber.

12. Apparatus as claimed in claim 7 wherein said fluid amplifier includes control ports for switching the flow of fluid from a power nozzle from one to the other of two output channels, said timing mechanism including a fluidic back pressure switch having one channel connected to one of said control ports and a restricted bypass line connected to the other control port.

13. Apparatus as claimed in claim 12 wherein said timing mechanism includes an enclosed chamber having a pair of spaced flexible wall elements dividing said chamber into subchambers, one of said subchambers communicating with one of said output channels of said fluid amplifier and another of said subchambers also communicating with said output channel but having its flow restricted, said enclosed chamber having an outlet communicating with the control port of said fluidic back pressure switch so that the flow in said restricted bypass line passes through said outlet and said enclosed chamber through an opening formed therein, and one of said flexible elements closing off said outlet when said subchambers are filled with fluid.

* * * * *